(12) United States Patent
Enomura

(10) Patent No.: US 9,427,891 B2
(45) Date of Patent: Aug. 30, 2016

(54) METHOD FOR PRODUCING FINE PARTICLES

(75) Inventor: Masakazu Enomura, Izumi (JP)

(73) Assignee: M. TECHNIQUE CO., LTD., Izumi-Shi (JP)

( * ) Notice: Subject to any disclaimer, the term of this patent is extended or adjusted under 35 U.S.C. 154(b) by 254 days.

(21) Appl. No.: 14/114,121

(22) PCT Filed: Apr. 13, 2012

(86) PCT No.: PCT/JP2012/060110
§ 371 (c)(1),
(2), (4) Date: Oct. 25, 2013

(87) PCT Pub. No.: WO2012/147538
PCT Pub. Date: Nov. 1, 2012

(65) Prior Publication Data
US 2014/0048984 A1    Feb. 20, 2014

(30) Foreign Application Priority Data

Apr. 26, 2011  (JP) ................ 2011-098780

(51) Int. Cl.
*B29B 9/16*     (2006.01)
*B01F 7/00*    (2006.01)
*B01J 19/18*    (2006.01)
B82Y 40/00     (2011.01)

(52) U.S. Cl.
CPC ............ *B29B 9/16* (2013.01); *B01F 7/00775* (2013.01); *B01J 19/1887* (2013.01); *B01J 2219/00094* (2013.01); *B01J 2219/00103* (2013.01); *B01J 2219/00135* (2013.01); *B01J 2219/00159* (2013.01); *B01J 2219/00162* (2013.01); *B01J 2219/00198* (2013.01); *B01J 2219/00213* (2013.01); *B01J 2219/00238* (2013.01); *B01J 2219/182* (2013.01); *B01J 2219/185* (2013.01); *B01J 2219/187* (2013.01); *B82Y 40/00* (2013.01)

(58) Field of Classification Search
CPC ................. B29B 9/16; B01J 19/1887; B01J 2216/00103; B01J 2216/187; B01J 2216/00213; B01J 2216/00094; B01J 2216/00238; B01J 2216/182; B01J 2216/00159; B01J 2216/00198; B01J 2216/00162; B01J 2216/185; B01J 2216/00135; B01F 7/00775; B82Y 40/00
See application file for complete search history.

(56) References Cited

U.S. PATENT DOCUMENTS

| | | |
|---|---|---|
| 2009/0110619 A1 | 4/2009 | Lee et al. |
| 2010/0155310 A1 | 6/2010 | Enomura |
| 2010/0202960 A1 | 8/2010 | Enomura |
| 2010/0215958 A1 | 8/2010 | Enomura |
| 2010/0243947 A1 | 9/2010 | Enomura |
| 2010/0330153 A1 | 12/2010 | Enomura |

FOREIGN PATENT DOCUMENTS

| | | | |
|---|---|---|---|
| CN | 101795772 A | | 8/2010 |
| EP | 2180021 A1 | | 4/2010 |
| EP | 2191890 A1 | | 6/2010 |
| EP | 2193865 A1 | | 6/2010 |
| EP | 2196194 A1 | | 6/2010 |
| EP | 2204351 A1 | | 7/2010 |
| JP | 3-159911 A | | 7/1991 |
| JP | 2004-049957 A | | 2/2004 |
| JP | 2007-069162 A | | 3/2007 |
| JP | 2009-013443 A | | 1/2009 |
| JP | 2009-082902 A | | 4/2009 |
| JP | 2009-108401 A | | 5/2009 |
| JP | 2010-018839 A | | 1/2010 |
| WO | WO 2009/008388 A1 | | 1/2009 |

*Primary Examiner* — Robert Jones, Jr.
(74) *Attorney, Agent, or Firm* — Birch, Stewart, Kolasch & Birch, LLP

(57) ABSTRACT

A method for controlling the particle size of deposited fine particles in a fine particle production method is provided. The method introduces a fluid to be processed between at least two processing surfaces, which are disposed facing each other and are advancible and retractable, at least one of the two processing surfaces rotating relative to the other, to deposit fine particles in the thin fluid film formed between the two processing surfaces. The particle size of the fine particles is controlled by controlling the temperature of the fluid that contains the separated fine particles. The temperature control can be accomplished by providing a temperature adjusting apparatus and a jacket in the flow channel or receptacle for the fluid after outflow and controlling the temperature of the fluid that contains the deposited fine particles.

3 Claims, 3 Drawing Sheets

METHOD FOR PRODUCING FINE PARTICLES

The present invention relates to a method for producing fine particles.

Fine particles are wanted in the entire industrial fields, wherein it is necessary to selectively produce fine particles whose size is from a micrometer to a nanometer in accordance with the intended use thereof. Especially, nanoparticles (fine particles with the size of nanometers), the fine particles whose diameter is less than 1 μm, express new characteristics that are different from those of particles; and therefore, a new industrial method for producing nanoparticles is wanted to be developed. In a conventional method for producing fine particles having the size of micrometers, there have been problems in reproducibility and energy cost, so that a method for producing fine particles with which the particle diameter thereof can be readily controlled from the size of micrometers to nanometers is eagerly wanted.

In order to solve subjects and problems of the conventional technology, called as "a microchemical process technology", the present applicant provided a method for separating nanoparticles (Patent Document 2) by using stirring and instantaneous/uniform mixing of a plurality of fluids in a narrow flow path based on the microchemical process with a totally new concept, more precisely, based on the principle of the apparatus shown in Patent Document 1 filed by the present applicant. This apparatus makes use of the principle of a mechanical seal, wherein a forced thin film fluid of a fluid to be processed is formed between processing surfaces which relatively moves so as to be able to approach to and separate from each other, and the said fluid to be processed is charged into between the rotating processing surfaces, whereby realizing to make the distance between the processing surfaces a minute space by a pressure balance between the supply pressure of the fluid and the pressure applied between the rotating processing surfaces. In the methods before the method based on the above-mentioned principle, the distance between these processing surfaces was controlled by a mechanical means and the like; but in these methods, a heat generated by rotation, a deformation or a misalignment of an axis caused by it, and others could not be absorbed; and thus, to realize the minute distance between the processing surfaces, at least 10 μm or less for this distance, had been substantially impossible. That is, by using the principle of the apparatus in Patent Document 1, separation of nanoparticles became possible by instantaneous chemical reaction, physicochemical reaction, or the like in the minute flow path; and inventors of the present application further carried out an extensive investigation, and as result, surprisingly, instantaneous stirring, mixing, reaction, and separation could be realized in a minute flow path of 0.1 to 10 μm, without saying 1 mm or less.

The method for producing nanopigments proposed in Patent Document 2 is a very useful method for producing fine particles because nanopigments can be produced in a low cost and a low energy, so that various methods to control particle diameter of the particles produced by carrying out this producing method are wanted to be developed.

PRIOR ART DOCUMENTS

Patent Document

Patent Document 1: Japanese Patent Laid-Open publication No. 2004-49957

Patent Document 2: International Patent Laid-Open Publication No. 2009/008388

DISCLOSURE OF THE INVENTION

Problems to be Solved by the Invention

In view of the situation mentioned above, the present invention has an object to provide a new method for controlling particle diameter of the separated fine particles.

Means for Solving the Problems

The present invention provides a method for producing fine particles wherein, the method in which a fluid to be processed is introduced between at least two processing surfaces which are disposed in a position they are faced with each other so as to be able to approach to and separate from each other, at least one of which rotates relative to the other whereby separating fine particles in a thin film fluid formed between the processing surfaces, particle diameter of the fine particles is controlled by controlling a temperature of the fluid that contains the said separated fine particles.

The present invention may be carried out by the method wherein, control of the temperature of the fluid that contains the separated fine particles is done by controlling a temperature of the fluid after flowing out from the processing surfaces.

Further, the present invention may be carried out by the method wherein, a temperature adjustment instrument is arranged in the flow path of the fluid to be processed after flowing out from the processing surfaces or in a storing unit thereof, whereby controlling the temperature of the fluid that contains the separated fine particles by using the said temperature adjustment instrument.

The present invention may be carried out as the method, wherein a plurality of fluids are used as the fluid to be processed, of the fluids to be processed, at least any one of the fluids passes through between the processing surfaces while forming the thin film fluid; at least one separate introduction path independent of a flow path through which the at least any one of the fluids to be processed passes is arranged; an opening which leads to the introduction path is provided to the at least anyone of the processing surfaces; at least one fluid which is different from the at least any one of the fluids is introduced between the processing surfaces through the opening, whereby mixing entire of these fluids to be processed in the thin film fluid, thereby separating fine particles in this thin film fluid. Preferably, this separation is done under a laminar flow condition in the thin film fluid.

Preferably, the present invention is carried out by using an apparatus provided with: a fluid pressure imparting mechanism for imparting a pressure to the fluids to be processed; a first processing member arranged with a first processing surface of the at least two processing surfaces; a second processing member arranged with a second processing surface of the at least two processing surfaces; and a rotation drive mechanism for rotating these processing members relative to each other; wherein, of the first processing member and the second processing member, at least the second processing member is provided with a pressure-receiving surface, and at least part of the pressure-receiving surface is comprised of the processing surfaces; and this pressure-receiving surface receives a pressure applied to the fluids to be processed by the fluid pressure imparting mechanism thereby generating a force to move in the direction of separating the second processing surface from the first processing surface.

Advantages

In the method for producing fine particles in which a fluid to be processed is introduced between at least two processing surfaces which are disposed in a position they are faced with each other so as to be able to approach to and separate from each other, at least one of which rotates relative to the other whereby separating fine particles in a thin film fluid formed between the processing surfaces, the inventor of the present invention found that particle diameter of the fine particles can be controlled by controlling temperature of the fluid that contains the said separated fine particles; and based on this finding, the present invention was completed. By this invention, a new method for controlling particle diameter of the separated fine particles could be provided.

By this invention, it became possible to control particle diameter of fine particles without changing the conditions until separation of the fine particles out from the fluid. In addition, according to the present invention, particle diameter of fine particles can also be controlled by concurrently setting the conditions until separation of the fine particles out from the fluid.

MODES FOR CARRYING OUT THE INVENTION

Hereinafter, the present invention will be explained in detail by referring to an example of the embodiments of the present invention. However, technical scope of the present invention is not restricted by the following embodiments and Examples.

Figure 1:
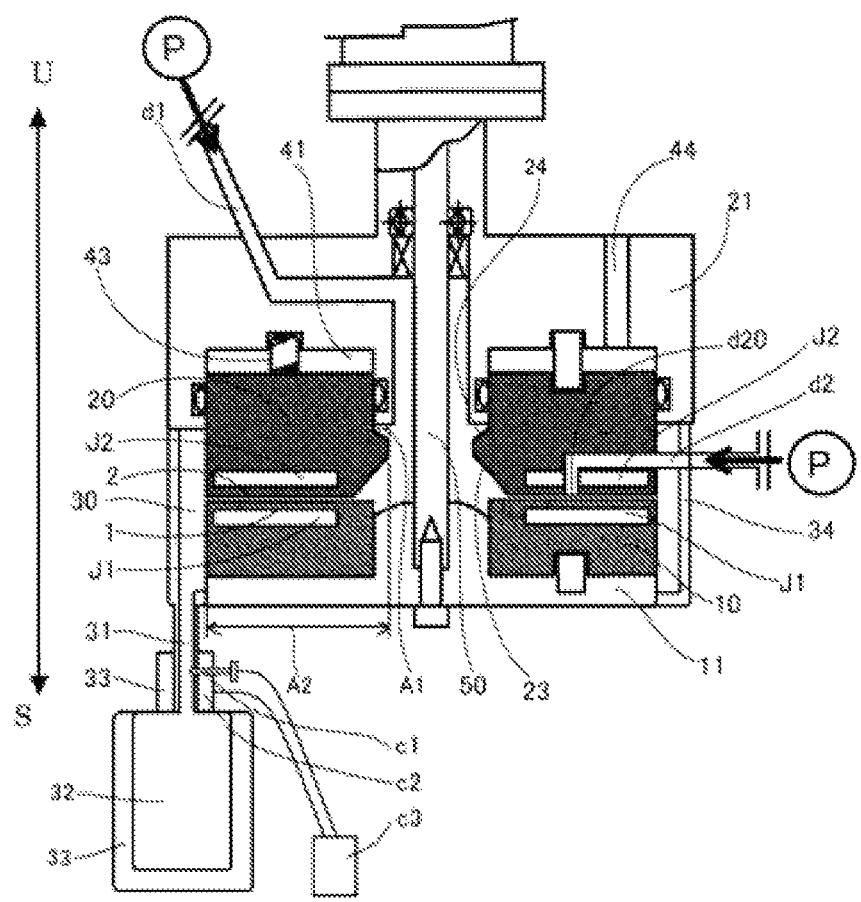
FIG. 1 is a schematic sectional view showing the fluid processing apparatus according to an embodiment of the present application of the invention.
Figure 2:
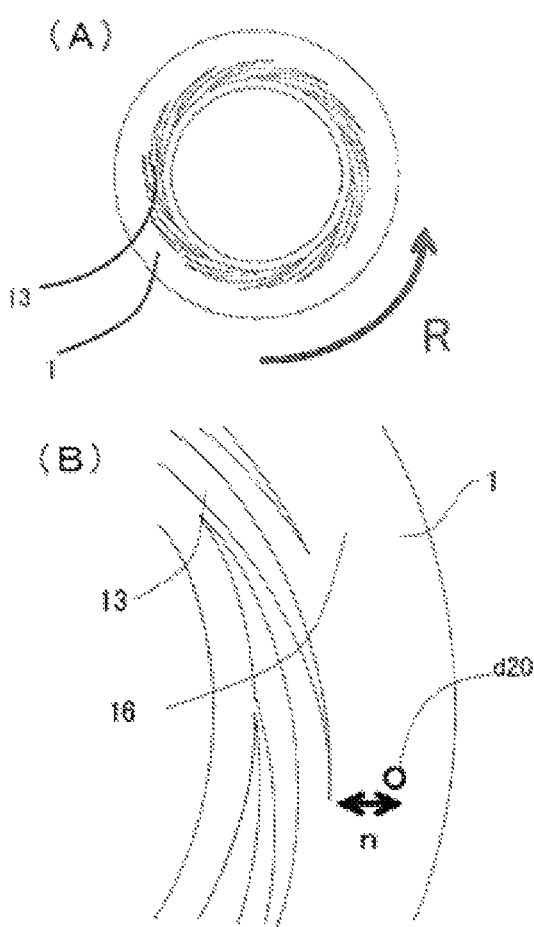
FIG. 2(A) is a schematic plane view of the first processing surface in the fluid processing apparatus shown in FIG. 1.
FIG. 2(B) is an enlarged view showing an important part of the processing surface in the apparatus.
Figure 3:
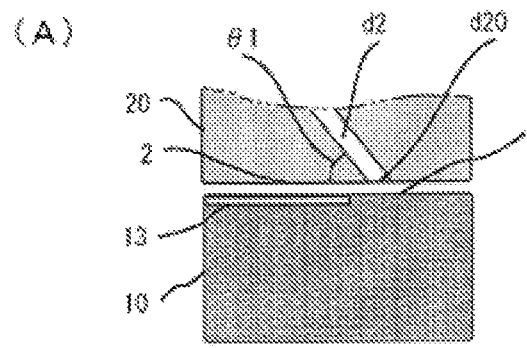
FIG. 3(A) is a sectional view of the second introduction member of the apparatus.
FIG. 3(B) is an enlarged view showing an important part of the processing surface for explaining the second introduction member.
Figure 3:
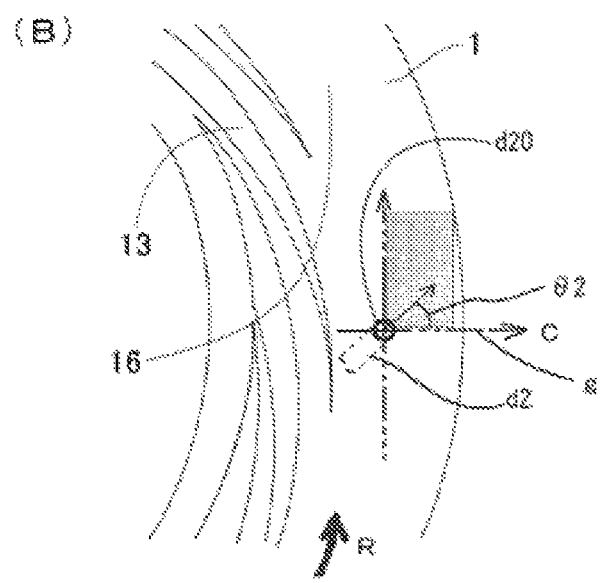

The fluid processing apparatus shown in FIG. 1 to FIG. 3 is similar to the apparatus described in Patent Document 2, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 µm to 50 µm. With this, the fluid to be processed passing through between the processing surfaces 1 and 2 becomes a forced thin film fluid forced by the processing surfaces 1 and 2.

With this apparatus, a single fluid may be processed; but a plurality of fluids may be processed as well. When a plurality of fluids are processed, the apparatus is connected to a flow path of the first fluid whereby forming part of the flow path of the first fluid; and part of the flow path of the second fluid other than the first fluid is formed. In this apparatus, the two paths converge into one, and two fluids are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal but also carbon, ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this depression 13 may be formed also on the second processing surface 2, or on both the first and second processing surfaces 1 and 2. By forming the depression 13 as mentioned above, the micro-pump effect can be obtained so that the fluid to be processed may be sucked into between the first and second processing surfaces 1 and 2.

It is preferable that the base edge of this depression 13 reach the inner periphery of the first processing member 10. The front edge of the depression 13 is extended to the direction of the outer periphery of the first processing surface 1; the depth thereof (cross section area) is made gradually shallower (smaller) from the base edge to the front edge.

Between the front edge of the depression 13 and the outer peripheral of the first processing surface 1 is formed the flat plane 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle (θ1) relative to the second processing surface 2. The elevation angle (θ1) is set at more than 0° and less than 90°, and when the reaction speed is high, the angle (θ1) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle (θ2) exists facing the rotation direction R from a reference line g, which is the line to the outward direction and in the radial direction passing through the opening d20. This angle (θ2) is also set preferably at more than 0° and less than 90°.

This angle (θ2) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening for introduction may be arranged just before the first and second processing surfaces 1 and 2 or in the side of further upstream thereof.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

In the above-mentioned apparatus, a reaction such as separation/precipitation and crystallization is effected while the fluids are being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the microparticles to be separated can be controlled by appropriately controlling rotation speed of the processing members 10 and 20, distance between the processing surfaces 1 and 2, concentration of raw materials in the fluids to be processed, kind of solvents in the fluids to be processed, and so forth.

In addition, in the present invention, particle diameter of the obtained fine particles can be controlled, after the fine particles are separated from the fluid by the above-mentioned method, by controlling the temperature of the fluid that contains the said fine particles.

To carry out this invention, as shown in FIG. 1, a casing is arranged circularly in the downstream discharge part of the processing surfaces 1 and 2 (in the outer side of the circle when the fluid to be processed is introduced from the inner side of the circular processing surfaces 1 and 2, and in the inner side of the circle when the fluid to be processed is introduced from the outer side of the circular processing surfaces 1 and 2); and then, by arranging the jacket 34 for temperature adjustment in this casing, temperature of the fluid that is discharged from the receiving flow path 30 may be controlled. Alternatively, temperature of the fluid may be controlled by arranging the temperature adjustment apparatus 33 in the transporting flow path 31 that comes out from the receiving flow path 30. Further alternatively, the receiving tank 32 is arranged in the downstream of the transporting flow path 31; and then, by arranging the temperature adjusting apparatus 33 to this receiving tank 32, temperature of the fluid may be controlled. The fluid that contains the separated fine particles is discharged as a mist from the downstream end of between the processing surfaces 1 and 2 to the receiving flow path 30 in the casing so that temperature of the fluid can be controlled readily because of the high thermal efficiency thereof.

The above-mentioned temperature control includes changing the temperature by heating or cooling the fluid that contains the separated fine particles, to change the temperature by mixing the said fluid to be processed with a new fluid, and to keep the temperature as it is without performing these operations to change the temperature. By these temperature controls, temperature of particle diameter of the obtained fine particles is controlled.

In the case that temperature of the fluid is changed, in order to obtain especially fine particles, the said temperature change is preferably 5° C. or more, or more preferably 25° C. or more. More precisely, the temperature change is made such that the temperature of the fluid that is controlled by the jacket 34 and the temperature adjusting apparatus 33 relative to the temperature of the fluid that contains the discharged fine particles is preferably 5° C. or more, or more preferably 25° C. or more. As mentioned above, the present invention includes to keep the temperature as it is without performing the operation to change the temperature; and thus, the present invention includes the case that the particle diameter is kept by controlling (keeping) the temperature of the fluid that contains the discharged fine particles at the same temperature by the jacket 34 and the temperature adjusting apparatus 33 and also the case that the particle diameter is changed.

Note that, the above-mentioned "control" includes the case not to change the temperature realized by the above processing in the passage of time (temperature is kept constant at a certain value in the passage of time) and the case to change the temperature in the passage of time (temperature is changed in the passage of time).

For this temperature control, it is also preferable to arrange a temperature control mechanism by a feedback control in 33 and 34, which are the apparatuses to adjust the temperature. This temperature difference control mechanism comprises the temperature measurement part C1, the heating or cooling part C2, the calculation part C3, and others. Note that, when the feedback control is not done, only the heating or cooling part C2 may be arranged.

The temperature measurement part C1 is arranged in 30 and 31, which are the flow paths of the fluid to be processed, and in the receiving tank 32 (the transporting flow path 31 in the example of the figure), and is the site where temperatures of the fluid that contains the separated fine particles is measured; and it is, for example, a temperature sensor. The heating or cooling part C2 is the site arranged in a part of the transporting flow path 31; and illustrative example thereof includes heating equipment such as an electric heater and a jacket for introducing a heating medium and cooling equipment such as a piping for a cooling medium. Though not shown in the figure, a new flow path for converging a new fluid whose temperature is controlled and optionally for mixing the resulting fluid may be arranged as the heating or cooling part C2. As to this new fluid, fluids such as a solvent and a gas which do not chemically affecting the separated fine particles may be used. The calculation part C3 is the part where action of the heating or cooling part C2 is controlled in accordance with the measurement result of the temperature measurement part C1; and this is, for example, a microcomputer which is electrically connected to the temperature measurement part C1 and the heating or cooling part C2. This calculation part C3 comprises switches to set the temperature differences among the respective fluids to be processed and a display part to display the operation state and the measured temperatures. The transporting flow path 31 may be provided with a structure to keep the temperature. This structure is not particularly restricted, while illustrative example thereof includes covering of this flow path with an insulating material, a heating part such as an electric heater, and a cooling part such as a pipe for a cooling medium. To keep the temperature constant at a certain value, the temperature variance of each fluid from the heating and cooling part to the processing surfaces is suppressed preferably within $\pm 1°$ C., or more preferably within $\pm 0.5°$ C.

This temperature control may be done continuously after the fluid is discharged from the processing surfaces 1 and 2; and alternatively, it may also be done after transporting it to a storage tank or the like. In either case, it is preferable that the temperature control be done before properties of the fine particles in the discharged fluid become stable.

The method for producing fine particles according to the present invention may be used in production of the following fine particles. Note that, the present invention is not applied only to the following examples; it can also be used for producing of fine particles that have been produced by means of conventional methods such as a batch process, a continuous process, a microreactor, and a micromixer.

Thus, the example mentioned above includes:

a reaction to obtain pigment particles by mixing an acidic pigment solution, prepared by dissolving at least one kind of pigment in a strong acid such as sulfuric acid, nitric acid, and hydrochloric acid, with a solution including water (acid pasting method), a reaction to precipitate pigment particles by pouring a pigment solution, prepared by dissolving at least one kind of pigment in an organic solvent, into a poor solvent which is a poor solvent to the said pigment and is compatible with the organic solvent used to prepare the pigment solution (reprecipitation method), or a reaction to obtain pigment particles by mixing a pigment solution, obtained by dissolving at least one kind of pigment either into a pH adjusting acidic or alkaline solution or into a mixed solution of the said pH adjusting solution with an organic solvent, with a pigment-separating solution not showing solubility to the pigment contained in the pigment solution or showing smaller solubility to the pigment than the solvent contained in the pigment solution, and yet being capable of changing pH of the pH adjusting solution.

A reaction to carry metal fine particles on a carbon black surface by a liquid phase reduction method (illustrative example of the metal includes at least one metal selected from the group consisting of platinum, palladium, gold, silver, rhodium, iridium, ruthenium, osmium, cobalt, manganese, nickel, iron, chromium, molybdenum, and titanium).

A reaction to produce crystals formed of a fullerene molecule and a fullerene nanowhisker/nanofiber nanotube by mixing a solution containing a first solvent having dissolved therein the fullerene with a second solvent having smaller solubility of the fullerene than the first solvent.

A reaction to reduce a metal compound or a metal ion (illustrative example of the metal includes a precious metal such as gold, silver, ruthenium, rhodium, palladium, osmium, iridium, and platinum, or cupper, or a metal alloy of two or more metals mentioned above).

A reaction to hydrolyze a ceramic raw material (illustrative example of the ceramic raw material includes at least one kind selected from Al, Ba, Mg, Ca, La, Fe, Si, Ti, Zr, Pb, Sn, Zn, Cd, As, Ga, Sr, Bi, Ta, Se, Te, Hf, Ni, Mn, Co, S, Ge, Li, B, and Ce).

A reaction to separate titanium dioxide superfine particles by hydrolysis of a titanium compound (illustrative example of the titanium compound includes at least one kind selected from tetraalkoxy titanium such as tetramethoxy titanium, tetraethoxy titanium, tetra-n-propoxy titanium, tetraisopropoxy titanium, tetra-n-butoxy titanium, tetraisobutoxy titanium, and tetra-t-butoxy titanium, or a derivative of them; and titanium tetrachloride, titanyl sulfate, titanium citrate, and titanium tetranitrate).

A producing reaction to co-precipitate and separate fine particles of a compound semiconductor by joining with an ion-containing fluid, which is a semiconductor raw material and contains different elements (illustrative example of the compound semiconductor includes a compound semiconductor of the II-VI groups, a compound semiconductor of the III-V groups, a compound semiconductor of the IV group, a compound semiconductor of the groups).

A reaction to produce semiconductor fine particles by reducing a semiconductor element (illustrative example of the semiconductor element includes an element selected form the group consisting of silicon (Si), germanium (Ge), carbon (C), and tin (Sn)).

A reaction to produce magnetic fine particles by reducing a magnetic raw material (illustrative example of the magnetic raw material includes at least one kind selected from nickel, cobalt, iridium, iron, platinum, gold, silver, manganese, chromium, palladium, yttrium, and lanthanide (neodymium, samarium, gadolinium, and terbium)).

A reaction to separate biologically ingestible fine particles by mixing a fluid which at least one kind of raw material of the biologically ingestible fine particles is dissolved in a first solvent with a solvent capable of becoming a second solvent having lower solubility than the first solvent.

Alternatively, a reaction to separate biologically ingestible fine particles by a neutralization reaction caused by mixing a fluid containing at least one kind of an acidic substance or a cationic substance with a fluid containing at least one kind of a basic substance or an anionic substance.

A treatment to obtain microemulsion particles by mixing a fluid to be processed that contains an oil phase component which contains a fat-soluble pharmacologically active substance with a fluid to be processed comprising at least aqueous dispersion solvent, or by mixing a fluid to be processed that contains a aqueous phase component which contains a water-soluble pharmacologically active substance with a fluid to be processed comprising at least an oil-based dispersion solvent.

Alternatively, a treatment to obtain a liposome by mixing a dispersed phase of a fluid to be processed with a continuous phase of a fluid to be processed, wherein at least any one of the dispersed phase or the continuous phase contains one or more kind of phospholipid, the dispersed phase contains a pharmacologically active substance, and the continuous phase is comprised of at least an aqueous dispersion solvent.

A treatment to obtain resin fine particles by mixing a fluid which a resin is dissolved in a solvent that is solubility and compatibility in the resin with an aqueous solvent, thereby effecting separation or emulsification.

Alternatively, a treatment to obtain resin fine particles by mixing a resin in the molten state obtained by heating with an aqueous solvent, thereby effecting emulsification and dispersion. Further alternatively, a treatment to aggregate resin fine particles by mixing a disperse solution of resin fine particles with a compound solution having a compound such as a salt dissolved therein.

Reactions to obtain an organic compound by an organic reaction of an organic compound starting raw material with various reactants, the reactions such as Friedel-Crafts reaction, nitration reaction, addition reaction, elimination reaction, transfer reaction, polymerization reaction, condensation reaction, coupling reaction, acylation, carbonylation, aldehyde synthesis, peptide synthesis, aldol reaction, indole reaction, electrophilic substitution reaction, nucleophilic substitution reaction, Wittig reaction, Michael addition reaction, enamine synthesis, ester synthesis, enzymatic reaction, diazo coupling reaction, oxidation reaction, reducing reaction, multistep reaction, selective addition reaction, Suzuki-Miyaura coupling reaction, Kumada-Corriu reaction, methathesis reaction, isomerization reaction, radical polymerization reaction, anionic polymerization reaction, cationic polymerization reaction, metal-catalyzed polymerization reaction, consecutive reaction, polymer synthesis, acetylene coupling reaction, episulfide synthesis, episulfide synthesis, Bamberger rearrangement, Chapman rearrangement, Claisen condensation, quinoline synthesis, Paal-Knorr furan synthesis, Paal-Knorr pyrole synthesis, Passerini reaction, Paterno-Buchi reaction, carbonyl-ene reaction (Prins reaction), Jacobsen rearrangement, Koenigs-Knorr glucosidation reaction, Leuckart-Wallach reaction, Horner-Wadsworth-Emmons reaction, Gassman reaction, Noyori assymmetric hydrogenation reaction, Perkin reaction, Petasis reaction, Tishchenko reaction, Tishchenko reaction, Ullmann coupling, Nazarov cyclization, Tiffeneau-Demjanov rearrangement, template synthesis, oxidation using selenium dioxide, Reimer-Tiemann reaction, Grob cleavage reaction, haloform reaction, Malaprade glycol oxidative cleavage, Hofmann elimination, thiocarbonylation by using Lawesson reagent, Lossen rearrangement, cyclic ketone synthesis by using FAMSO, Favorskii rearrangement, Feist-Benary furan synthesis, Gabriel amine synthesis, Glaser reaction, Grignard reaction, Cope elimination, Cope rearrangement, diimide reduction of alkynes, Eschenmoser aminomethylation reaction, [2+2] photocyclization reaction, Appel reaction, aza-Wittig reaction, Bartoli indole synthesis, Carroll rearrangement, Chichibabin reaction, Clemmensen reduction, Combes quinoline synthesis, Tsuzi-Trost reaction, TEMPO oxidation, dihydroxylation by using osmium tetraoxide, Fries rearrangement, Neber rearrangement, Barton-McCombie deoxygenation, Barton decarboxylation, Seyferth-Gilbert alkyne synthesis, Pinnick (Kraus) oxidation, Itoh-Saegusa oxidation, Eschenmoser cleavage reaction, Eschenmoser-Claisen rearrangement, Doering-LaFlamme allene synthesis, Corey-Chakovsky reaction, acyloin condensation, Wolff-Kishner reduction, IBX oxidation, Parkin-Doering oxidation, Reissert reaction, Jacobsen's kinetic optical resolution hydrolysis, benzilic acid rearrangement, Hiyama cross-coupling, Luche reduction, oxy merculation, Vilismeier-Haak reaction, Wolff rearrangement, Kolbe-Schmitt reaction, Corey-Kim oxidation, Cannizzaro reaction, Henry reaction, transformation of an alcohol to an alkane, Arndt-Eistert synthesis, hydroformylation reaction, Peterson olefination, decarbonylation reaction, Curtius rearrangement, Wohl-Zeigler bromination at allyl position, Pfitzner-Moffatt oxidation, McMurry coupling, Barton reaction, Balz-Shiemann reaction, Masamune-Bergman reaction, Dieckmann condensation, pinacol coupling, Williamson ether synthesis, iodolactonization reaction, Harries ozone decomposition, oxidation by active manganese dioxide, alkyne cyclotrimerization reaction, Kumada-Tamao-Corriu cross-coupling, syn-β elimination of a sulfoxide and a selnoxide, Fisher indole synthesis, Oppenauer oxidation, Darzens condensation reaction, Alder ene reaction, Sarett-Collins oxidation, Nozaki-Hiyama-Kishi coupling reaction, Weinreb ketone synthesis, DAST fluorination, Corey-Winter olefin synthesis, Hosomi-Sakurai reaction, alcohol oxidation by using PCC (PDC), Jones oxidation, Keck allylation reaction, cyanide addition by using Nagata reagent, Negishi coupling, Ireland-Claisen rearrangement, Baeyer-Villiger oxidation, p-methoxybenzyl (PMB or MPM), dimethoxybenzyl (DMB) protection, deprotection, Wacker oxidation, Myers assymmetric alkylation, Yamaguchi macrolactonization, Mukaiyama-Corey macrolactonization, Bode peptide synthesis, Lindlar reduction, homogeneous hydrogenation, orthometallation, Wagner-Meerwein rearrangement, Wurtz reaction, ketone synthesis by using 1,3-dithiane, Michael addition, ketone synthesis by Stork enamine, Pauson-Khand cyclopentene synthesis, and Tebbe reaction.

EXAMPLES

Hereinafter, the present invention will be explained in more detail by showing Examples; but, the present invention is not limited only to these Examples.

Note that, in the following Examples, the term "from the center" means "from the first introduction part d1" of the fluid processing apparatus shown in FIG. 1; the first fluid means the above-mentioned first fluid to be processed; and the second fluid means the above-mentioned second fluid to be processed which is introduced from the second introduction part d2 of the processing apparatus shown in FIG. 1.

Examples 1 to 6

Production of Danazol Fine Particles

The precipitation reaction is carried out, as shown FIG. 1, by mixing a danazol solution with pure water in a thin film fluid formed between the processing surfaces 1 and 2 which are disposed in a position they are faced with each other so as to be able to approach to and separate from each other, at least one of which rotates relative to the other, by using a reaction apparatus, wherein the fluids are uniformly dispersed, stirred, and mixed in the said thin film fluid.

While pure water was introduced as the first fluid from the center at the supply rate of 100 mL/minute with the supply pressure of 0.20 MPa and the back pressure of 0.10 MPa and with the rotation speed of 1000 rpm, a 1% by weight of danazol solution obtained by dissolving danazol powders into ethanol was introduced as the second fluid into between the processing surfaces at the supply rate of 10 mL/minute.

The first fluid and the second fluid were mixed in the thin film fluid; and the dispersion solution of danazaol fine particles was discharged from the processing surfaces 1 and 2, and then recovered at the outlet port of the transporting flow path 31 via the receiving flow path 30 in the casing having heating and cooling water introduced into the jacket 34 thereof. The danazol fine particles in the dispersion solution of the recovered danazol fine particles were loosely aggregated, and collected by using a 0.45 μm membrane filter, washed by pure water, and then dried under vacuum to obtain danazol fine particle powders.

The obtained danazol fine particle powders were put on a collodion film, and then, particle diameter of the primary particle thereof was confirmed by the TEM observation. The TEM observation was done by using JEM-2100 (manufactured by JEOL Ltd.) to observe and measure the primary particle diameter in a plurality of observation spots with the observation magnification of 20,000; and the average value thereof was used.

Supplied temperatures of the first and the second fluids, temperature of the heating and cooling water charged into the Jacket 34, temperature of the dispersion solution of the recovered danazol fine particles, and primary particle diameter of the danazol fine particle are all shown in Table 1. The supplied temperatures of first and second fluids shown in Table 1 were measured just before the introduction of the first fluid and the second fluid into the processing apparatus (in other words, just before each fluid was introduced into between the processing surfaces 1 and 2). Temperature of the dispersion solution of the danazol fine particles shown in Table 1 was measured as to the dispersion solution of danazol fine particles recovered in the beaker arranged at the outlet port of the transporting flow path 31.

TABLE 1

| Examples | First fluid (° C.) | Second fluid (° C.) | Temperature of heating and cooling water charged into Jacket 34 (° C.) | Dispersion solution of danazol fine particles (° C.) | Primary Particle diameter (nm) |
| --- | --- | --- | --- | --- | --- |
| 1 | 25 | 25 | −5 | 0 | 90 |
| 2 | | | 0 | 2 | 120 |
| 3 | | | 2 | 5 | 140 |
| 4 | | | 5 | 12 | 180 |
| 5 | | | 25 | 25 | 230 |
| 6 | | | 45 | 45 | 560 |

Examples 7 to 10

By using the apparatus shown in FIG. 1, the precipitation reaction is carried out by mixing a nickel solution with reducing solution by using the reaction apparatus which uniformly disperses, stirs, and mixes in a thin film fluid formed between the processing surfaces 1 and 2 which are disposed in a position they are faced with each other so as to be able to approach to and separate from each other, at least one of which rotates relative to the other.

While a reducing solution of an ethylene glycol solution containing 2% by weight of hydrazine monohydrate and 0.15% by weight of KOH was introduced as the first fluid at the supply rate of 400 mL/minute from the center with the supply pressure of 035 MPa and the back pressure of 0.20 MPa and with the rotation speed of 1500 rpm, an aqueous 5% by weight nickel sulfate hexahydrate solution obtained by dissolving the nickel sulfate hexahydrate in pure water was introduced as the second fluid into between the processing surfaces at the supply rate of 7.5 mL/minute. The first fluid and the second fluid were mixed in the thin film fluid; and the dispersion solution of nickel fine particles or the dispersion solution of precursor fine particles of the nickel fine particles was discharged from the processing surfaces 1 and 2; and then, the particles were recovered as the dispersion solution of nickel fine particles at the outlet port of the transporting flow path 31 via the receiving flow path 30 in the casing having the heating and cooling water introduced into the jacket 34 thereof. The recovered nickel fine particles in the dispersion solution of the nickel fine particles were loosely aggregated, collected by a filter cloth with 1 μm opening, washed by pure water and by acetone, and then dried under vacuum to obtain the nickel fine particle powders.

The SEM observation of the obtained nickel fine particle powders was done, and then, particle diameter of the primary particle thereof was confirmed.

Supplied temperatures of the first and the second fluids, temperature of the heating and cooling water charged into the Jacket 34, temperature of the dispersion solution of the recovered nickel fine particles, and primary particle diameter of the nickel fine particle are all shown in Table 2. The supplied temperatures of first and second fluids shown in Table 2 were measured just before the introduction of the first fluid and the second fluid into the processing apparatus (in other words, just before each fluid was introduced into between the processing surfaces 1 and 2). Temperature of the dispersion solution of the nickel fine particles shown in Table 2 was measured as to the dispersion solution of nickel fine particles recovered in the beaker arranged at the outlet port of the transporting flow path 31.

Observation with Scanning Electron Microscope

Observation with a scanning electron microscope (SEM) was done by using the field emission type scanning electron microscope (FE-SEM) JSM-7500F (manufactured by JEOL Ltd.).

TABLE 2

| Examples | First fluid (° C.) | Second fluid (° C.) | Temperature of heating and cooling water charged into Jacket 34 (° C.) | Dispersion solution of nickel fine particles (° C.) | Primary Particle diameter (nm) |
| --- | --- | --- | --- | --- | --- |
| 7 | 110 | 30 | 50 | 63 | 1000 |
| 8 | | | 90 | 100 | 400 |
| 9 | | | 110 | 110 | 70 |
| 10 | | | 130 | 124 | 50 |

As can be seen above, it was confirmed that the particle diameter changes when the fluid obtained after it is discharged from the processing surfaces 1 and 2 is heated and cooled. Accordingly, it was confirmed that particle diameter of the fine particles can be controlled by controlling the temperature of the fluid that contains the fine particles separated in the thin film fluid formed between the processing surfaces 1 and 2.

1 first processing surface
2 second processing surface
10 first processing member
11 first holder
20 second processing member
21 second holder
33 temperature adjusting apparatus
34 jacket
d1 first introduction part
d2 second introduction part
d20 opening
p fluid pressure imparting mechanism

The invention claimed is:

1. A method for producing particles, comprising the steps of:
   introducing a fluid to be processed into a processing apparatus including at least two processing surfaces which are disposed in a position facing each other, the at least two processing surfaces being operable to approach to and separate from each other, at least one of the at least two processing surfaces rotating relative to the other;
   feeding the fluid to be processed into a space between the at least two processing surfaces;
   forming a thin film fluid in the space between the at least two processing surfaces;
   separating particles in the thin film fluid formed between the processing surfaces, thereby forming a fluid containing the separated particles;
   providing a temperature adjusting apparatus coupled to a storing unit which is configured to receive the fluid containing the separated particles after being discharged from the space between the at least two processing surfaces;
   supplying the fluid containing the separated particles, after being discharged from the space between the at least two processing surfaces, into the storing unit via a transporting flow path communicating with the space between the at least two processing surfaces; and
   controlling a temperature of the fluid containing the separated particles by the temperature adjusting apparatus, thereby controlling diameter of the separated particles.

2. The method for producing particles according to claim 1, wherein the storing unit is a separate body from the processing apparatus.

3. The method for producing particles according to claim 1, wherein the step of controlling the temperature of the fluid containing the separated particles comprises the step of providing 5° C. or more of temperature change to the fluid containing the separated particles discharged from the space between the at least two processing surfaces via the temperature adjusting apparatus.

* * * * *